R. N. LYONS.
CORRUGATOR.
APPLICATION FILED JAN. 29, 1910.

985,044.

Patented Feb. 21, 1911.

Witnesses

Inventor
Roy N. Lyons
By
Attorney

UNITED STATES PATENT OFFICE.

ROY N. LYONS, OF JEROME, IDAHO.

CORRUGATOR.

985,044.  Specification of Letters Patent.  Patented Feb. 21, 1911.

Application filed January 29, 1910. Serial No. 540,922.

*To all whom it may concern:*

Be it known that I, ROY N. LYONS, a citizen of the United States, residing at Jerome, in the county of Lincoln and State of Idaho, have invented certain new and useful Improvements in Corrugators, of which the following is a specification.

My invention relates to improvements in corrugators and it consists in the constructions, combinations, and arrangements herein described and claimed.

An object of my invenion is to provide an improved corrugator constructed to form irrigating trenches or corrugations, having smooth walls consolidated by pressure.

A further object of my invention is to provide an improved corrugator constructed to excavate an irrigating trench and compress the walls thereof and to mold the walls thereof under an adjusted pressure which can be varied for various characters of soil.

Figure 1:
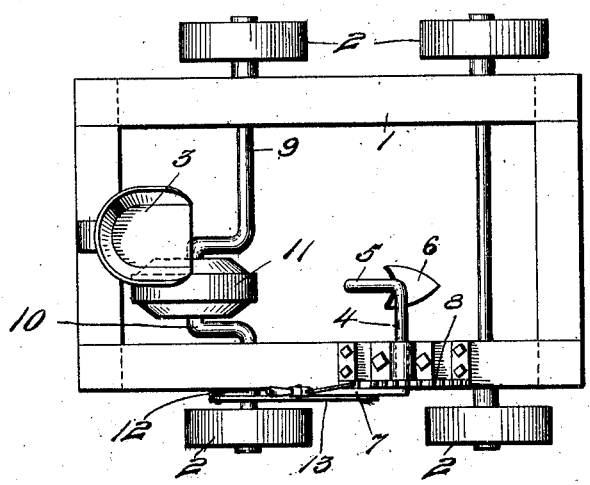
Figure 2:
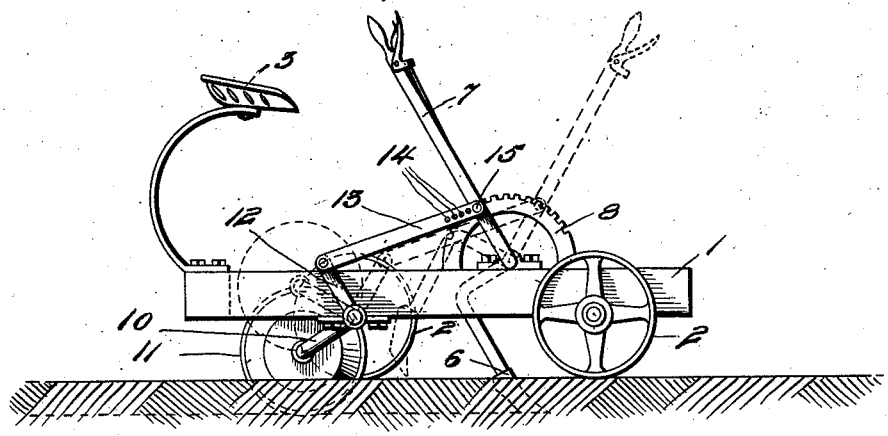

In the accompanying drawings forming a part of this application and in which similar reference symbols indicate corresponding parts in the several views: Figure 1 is a plan view illustrating one embodiment of my invention; Fig. 2 is a side elevation of the construction shown in Fig. 1.

Referring to the drawings, 1 indicates a frame provided with any usual truck wheels 2 and seat 3. A rod 4 is journaled in the frame and provided with an angular portion 5 for supporting any desired form of cultivator shovel 6. An adjusting lever 7 is secured to the rod 4 in position for locking engagement with a toothed segment 8, for shifting the shovel 6 to regulate the depth of its cut. The rear axle 9 is bent to form a crank 10, on which is rotatably mounted a shaping wheel 11, in position to track with the shovel 6. A crank 12 is rigidly secured to the axle 9, and connected by a link 13 to the lever 7; thereby providing a construction in which the lever 7 constitutes a common means for simultaneously shifting the shovel and shaping wheel. The link 13 is shown provided with a series of openings 14 adapted to receive a pin 15 threaded into the lever 7, for varying the angular position of the crank 10 relative to said lever; thereby providing a simple and convenient means for varying the relative positions of the shaping wheel and shovel, to adapt the pressure of the shaping wheel to various different characters of soil.

I have illustrated preferred and satisfactory constructions, but changes could be made wihin the spirit and scope of my invention.

Having described my invention, what I claim as new and desire to secure by Letters-Patent is:

1. In a corrugator, the combination of a frame, a shaping wheel and shovel adjustably mounted on said frame, a common means for shifting said wheel and shovel, and means for varying the relative positions of said wheel and shovel, substantially as described.

2. In a corrugator, the combination of a frame, a shaping wheel swingingly supported in said frame, a shovel swingingly mounted on said frame, a common means for simultaneously swinging said wheel and shovel, and means for shifting the angle of swing of said wheel relative to said shovel, substantially as described.

3. In a corrugator, the combination of a frame, a shaping wheel and shovel journaled on said frame, cranks secured to the journals of said wheel and shovel, a link connecting said cranks for simultaneously shifting said wheel and shovel, and means for adjusting said link for varying the relative positions of said wheel and shovel, substantially as described.

In testimony whereof I affix my signature in presence of two witnesses.

ROY N. LYONS.

Witnesses:
HERBERT L. OWENS,
EARL E. FILL.